Patented Apr. 7, 1925.

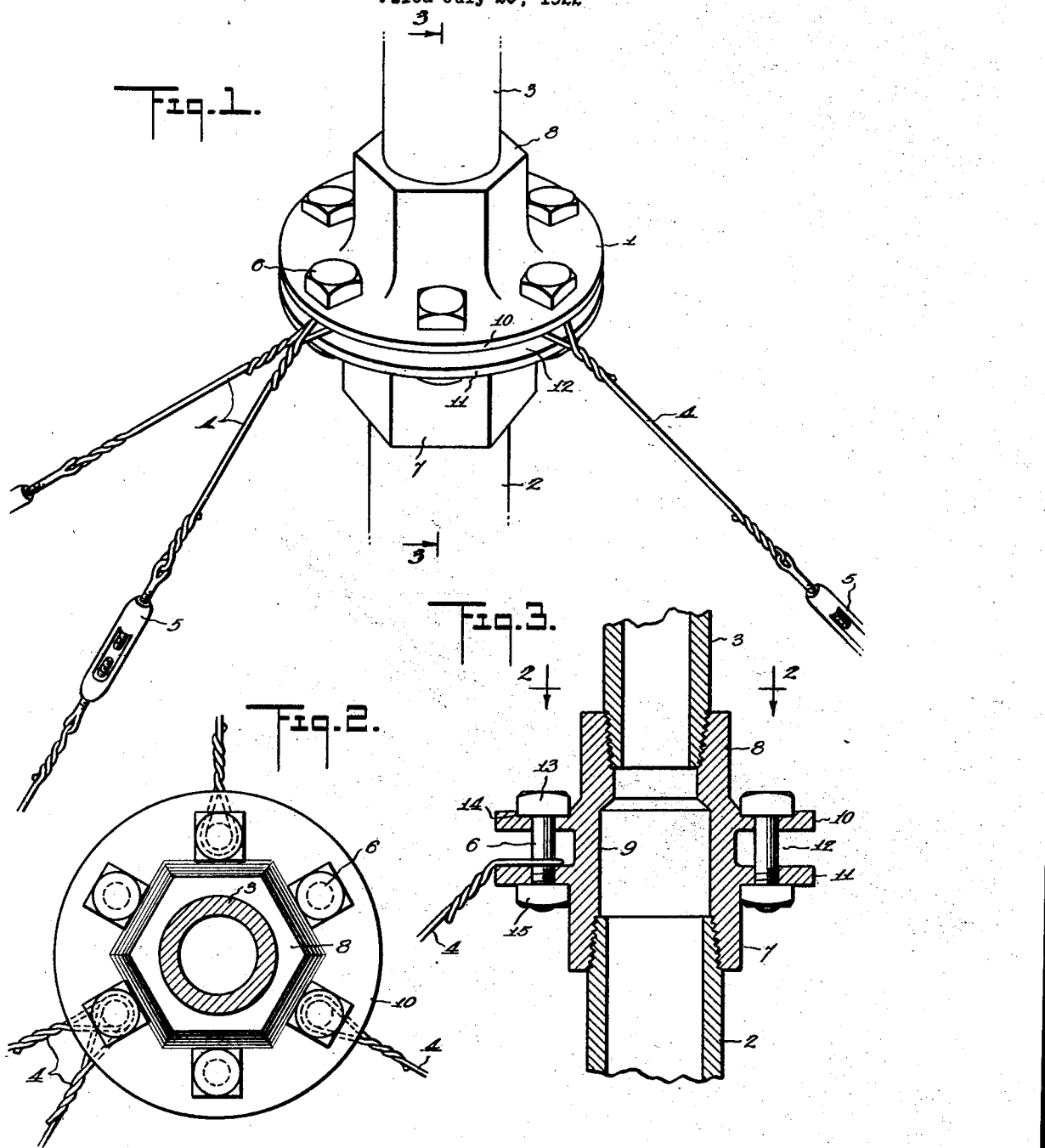

1,533,019

UNITED STATES PATENT OFFICE.

ALBERT LINK AND LESTER W. LINK, OF BROOKLYN, NEW YORK; SAID LESTER W. LINK ASSIGNOR TO SAID ALBERT LINK.

GUY COUPLER FOR MASTS.

Application filed July 25, 1922. Serial No. 577,456.

*To all whom it may concern:*

Be it known that we, ALBERT LINK and LESTER W. LINK, both citizens of the United States, and residents of the city of New York, borough of Brooklyn, in the county of Kings and State of New York, have invented a new and Improved Guy Coupler for Masts, of which the following is a full, clear, and exact description.

This invention relates to couplers and particularly to couplers adapted to couple the sections of a mast together and has for an object to provide a construction which acts in the double capacity of a coupler and as means for receiving guy members.

Another object of the invention is to provide a coupler wherein a bolt or pin receiving flanges are provided arranged at different points around the coupler for permitting different locations of guy members connected thereto.

A further object, more specifically, is to provide a coupling for masts in which threaded openings are provided at the top and bottom for receiving pipes, poles and the like and pin receiving flanges are provided for receiving guy ropes or wires.

In the accompanying drawing—

Figure 1 is a fragmentary perspective view of a coupler disclosing an embodiment of the invention, the same being shown applied to a mast.

Figure 2 is a transverse sectional view through Figure 1, approximately on line 2—2.

Figure 3 is a vertical sectional view through Figure 1, approximately on line 3—3.

Referring to the accompanying drawing by numerals, 1 indicates a coupler disclosing an embodiment of the invention, said coupler being connected to a mast section 2 at the bottom and a mast section 3 at the top. Also associated with the coupler 1 is any desired number of guy members 4 which may be wire, rope or other members provided with turn buckles 5 if desired. Also if desired, two or more of the guy members could be secured to the same bolt or pin 6.

In using the coupler 1 in a mast structure, one coupler could be used or any desired number, according to the number of sections 2 and 3 provided. In Figure 3, the sections 2 and 3 are shown as tubular and threaded into the lower and top projections 7 and 8, though if preferred wood or some other material could be used and secured in place by threads or other desired means. The projections or bosses 7 and 8 merge into a central body 9 which is also preferably hollow and said body in turn merges into a pair of annular flanges 10 and 11 spaced a short distance apart for providing an annular groove 12. Any desired number of pins or bolts 6 may be provided and caused to extend from one flange to the other as clearly shown in Figure 3. In the particular structure shown in Figure 3, bolts are used with the square heads 13 fitting into depressions 14 formed in the upper surface of flange 10. Suitable nuts 15 are threaded onto the lower ends of the bolts 6 whereby said bolts are rigidly held in place. By countersinking the square heads 13, the nuts 15 may be readily tightened without the bolts turning.

When placing the mast in position, any desired number of guy members 4 may be used and one or more members connected with any of the bolts 6. If the mast is very high, usually one or more guy members are connected to each bolt 6 on the lower couplers while a less number are connected to the higher couplers. By the use of pins or bolts 6, the guy members 4 may be threaded around these bolts and then twisted so as to be locked in place or guy members having a permanent form of eye might be used, said eye being first positioned in the groove 12 and then the bolts or pins inserted afterwards. It will thus be seen that the flanges 10 and 11 provide means for receiving anchoring pins or bolts for guy members of different kinds.

What we claim is:

A guy coupler for masts, comprising a body formed with means at the upper and lower parts for receiving mast sections, a pair of parallel circumferentially extending horizontal flanges extending from said body, and a plurality of members extending through said flanges for receiving guy members.

ALBERT LINK.
LESTER W. LINK.